United States Patent
Pillman et al.

(10) Patent No.: US 9,438,899 B1
(45) Date of Patent: Sep. 6, 2016

(54) STATISTICALLY LOSSLESS COMPRESSION SYSTEM AND METHOD

(71) Applicant: Exelis Inc., McLean, VA (US)

(72) Inventors: Bruce Harold Pillman, Rochester, NY (US); Wayne Prentice, McLean, VA (US); Michael E Napoli, McLean, VA (US)

(73) Assignee: Harris Corporation, Melbourne, FL (US)

( * ) Notice: Subject to any disclaimer, the term of this patent is extended or adjusted under 35 U.S.C. 154(b) by 123 days.

(21) Appl. No.: 14/103,604

(22) Filed: Dec. 11, 2013

(51) Int. Cl.
G06K 9/46 (2006.01)
H04N 19/13 (2014.01)
H04N 19/169 (2014.01)

(52) U.S. Cl.
CPC .. *H04N 19/00121* (2013.01); *H04N 19/00339* (2013.01)

(58) Field of Classification Search
CPC .. H04N 19/44; H04N 19/52; H04N 19/0009; H04N 19/12; H04N 19/124; H04N 19/139; H04N 19/159; H04N 19/36; H04N 19/593; H04N 19/61; H04N 19/107; H04N 19/00339; H04N 19/00121
USPC .................................. 382/244, 248, 232, 239
See application file for complete search history.

(56) References Cited

U.S. PATENT DOCUMENTS

| 5,708,511 A * | 1/1998 | Gandhi | H04N 19/50 375/E7.088 |
|---|---|---|---|
| 6,269,193 B1 * | 7/2001 | Young | G06T 9/005 382/244 |
| 6,339,657 B1 * | 1/2002 | Yamaguchi | H04N 19/503 375/240.03 |
| 2006/0071825 A1 * | 4/2006 | Demos | H03M 7/24 341/50 |
| 2006/0140487 A1 * | 6/2006 | Tabata | H04N 1/642 382/232 |
| 2008/0112632 A1 * | 5/2008 | Vos | G10L 19/0017 382/248 |
| 2011/0099295 A1 * | 4/2011 | Wegener | H03M 7/24 709/247 |
| 2011/0141845 A1 * | 6/2011 | Peacock | G01V 1/22 367/13 |
| 2012/0163463 A1 * | 6/2012 | Edelhaeusser | G06K 9/00335 375/240.16 |
| 2013/0009977 A1 * | 1/2013 | Strom | G06T 9/00 345/586 |
| 2013/0343668 A1 * | 12/2013 | Li | G06T 9/00 382/244 |
| 2014/0098856 A1 * | 4/2014 | Gu | H04N 19/0009 375/240.03 |

OTHER PUBLICATIONS

Lukin, Zriakhov, Ponomarenko, Kaarna, "An Automatic Approach to Lossy Compression of Images Corrupted by Poisson Noise," MRRS-2008 Symposium.
Nicula, Berghmans, Hochedez, "Poisson Recoding of Solar Images for Enhanced Compression," Solar Physics 2005.
Osama K. Al-Shaykh, and Russell M. Mersereau, "Lossy Compression of Noisy Images," IEEE Transactions on Image Processing, 1998.
Shahnaz, Walkup, Krile, "Image Compression in signal-dependent noise," Applied Optics, 1999.

* cited by examiner

*Primary Examiner* — Mekonen Bekele
(74) *Attorney, Agent, or Firm* — Davidson Berquist; Jackson & Gowdey LLP

(57) ABSTRACT

A statistically lossless transform (SLT) can be used with data (e.g., image data) to be compressed. Prior to compression, an SLT stabilizes the variance for a read noise+Poisson process. The SLT redistributes (image) data that has been quantized with a linear uniform quantizer and essentially assures there are no gaps in the output values (i.e., all output digital values are used). The SLT re-quantizes the data with a quantization interval width that is proportional to the standard deviation of the process.

20 Claims, 10 Drawing Sheets

STATISTICALLY LOSSLESS COMPRESSION SYSTEM AND METHOD

FIELD OF INVENTION

The present invention is directed to a statistically lossless compression method and system, and, in one embodiment, to a statistically lossless compression method and system for image processing that utilizes variable quantization information.

DISCUSSION OF THE BACKGROUND

FIG. 1 is a block diagram of a hypothetical image processing system utilizing pre-processing of image data prior to a compression and a post-processing process to reverse the pre-processing after decompression/expansion of the compressed data. In known image processing systems and methods, non-linear transformations of image data have been used in pre-processing steps prior to image compression. For example, some known systems utilize Anscombe and Homomorphic transforms or a lookup table (such as in U.S. Pat. No. 5,859,927, incorporated by reference). Other known techniques are disclosed in: (1) Osama K. Al-Shaykh, and Russell M. Mersereau, "Lossy Compression of Noisy Images," IEEE Transactions on Image Processing, 1998; (2) Lukin, Zriakhov, Ponomarenko, Kaarna, "An Automatic Approach to Lossy Compression of Images Corrupted by Poisson Noise," MRRS-2008 Symposium Proceedings, Kiev, Ukraine, 2008; (3) Shahnaz, Walkup, Krile, "Image Compression in signal-dependent noise," Applied Optics, 1999; and (4) Nicula, Berghmans, Hochedez, "Poisson Recoding Of Solar Images For Enhanced Compression," Solar Physics 2005. Each of those references is incorporated herein by reference.

A known alternative pre-processing step is known as "bit trimming." Bit trimming reduces the number of digital values to be encoded, allowing better compression, by performing a simple divide by a power of 2, which discards the least significant bits of the (image) data. While bit trimming reduces the data load, it does not preserve the statistically significant data as well as possible.

As shown in FIG. 1, an optional delta quantizer and an optional inverse delta quantizer may be used independently of the pre-processing to provide an alternate form of compression. In such a configuration, the delta quantizer applies to the compression circuitry the delta between a predicted value to be encoded and the actual value output from the pre-processor, and the inverse delta quantizer performs the inverse process during decompression.

BRIEF DESCRIPTION OF THE DRAWINGS

The following description, given with respect to the attached drawings, may be better understood with reference to the non-limiting examples of the drawings, wherein.

DISCUSSION OF THE PREFERRED EMBODIMENTS

As an alternative to known pre-processing techniques, the present invention provides a new statistically lossless transform (SLT) method and system that, for example, can be used with image data. However, the present invention is not limited to image data and may be used with other types of data that can withstand lossy compression where the loss is statistically inconsequential. During the pre-processing of the data, an SLT stabilizes the variance for a read noise+Poisson process. The variance of the process is essentially linear with the input signal, but has a nonzero variance at zero mean, which is not purely Poisson. The SLT redistributes (image) data that has been quantized with a linear uniform quantizer so the variance is stabilized and essentially assures there are no gaps in the output values (i.e., all output digital values are used). The SLT re-quantizes the data with a quantization interval width that is proportional to the standard deviation of the process, while increasing efficiency of the transformation. If the signal-dependent variance of the input signal is consistent with the model, the variance of the transformed (i.e., pre-processed) signal is nearly constant as it is applied to the compression system.

In general, for most image acquisition systems, the temporal noise depends on the sensor sensitivity and noise characteristics. The temporal noise measurement includes read noise and Poisson noise (based on dark current and on the arrival of photons in the pixel), but not fixed pattern noise. Sensors that operate by collecting photons exhibit Poisson noise statistics, where the variance is equal to the mean of the signal. In practice, there is also read noise, so the variance at zero photons is not zero. Also, depending on offsets in the analog subsystem and the A/D converter, the digitized signal in code values does not necessarily have a zero mean at a zero photon condition. While these variations change the mean signal and noise levels, in all of these cases, the temporal noise is such that the variance can be modeled as a linear function of signal level, with slope and offset terms that depend on the image acquisition hardware and acquisition settings.

Figure 1:
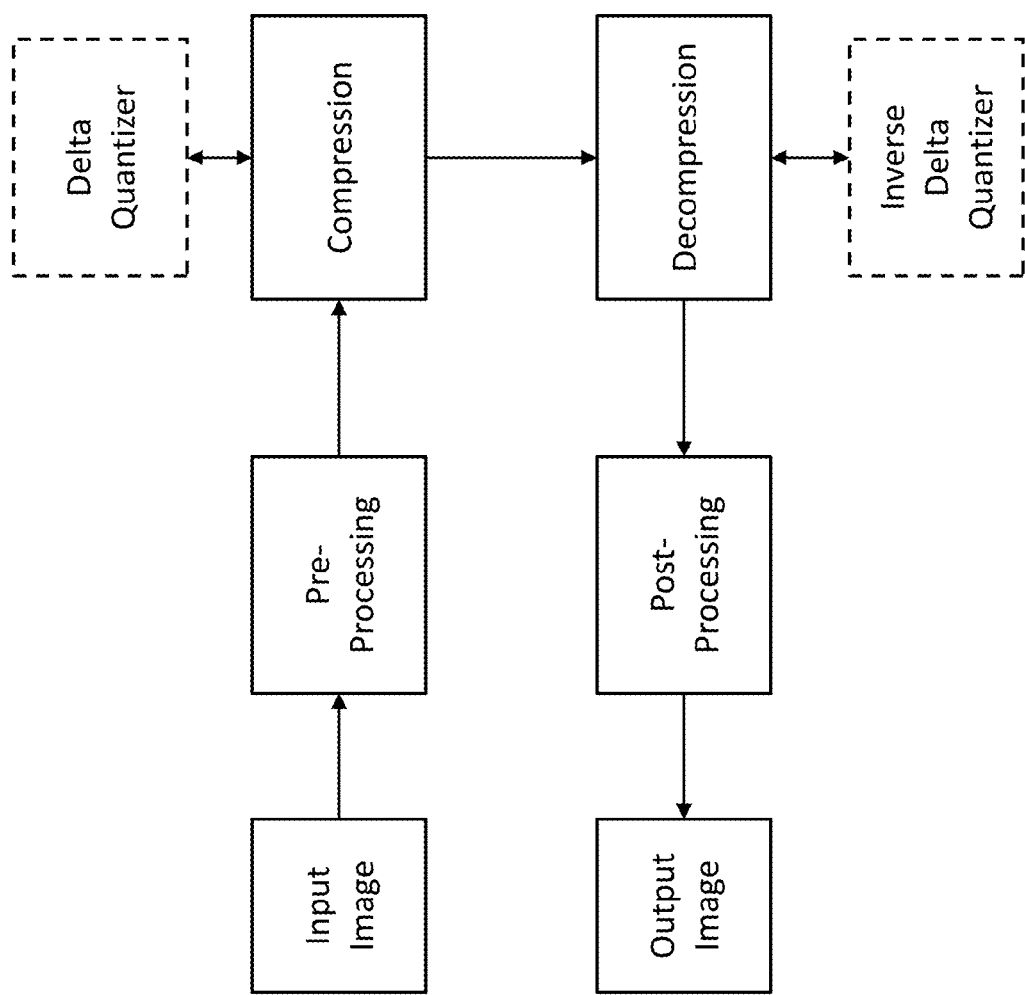
FIG. 1 is a block diagram of a hypothetical image processing system utilizing pre-processing of image data prior to a compression and a post-processing process to reverse the pre-processing after decompression/expansion of the compressed data.
Figure 2:
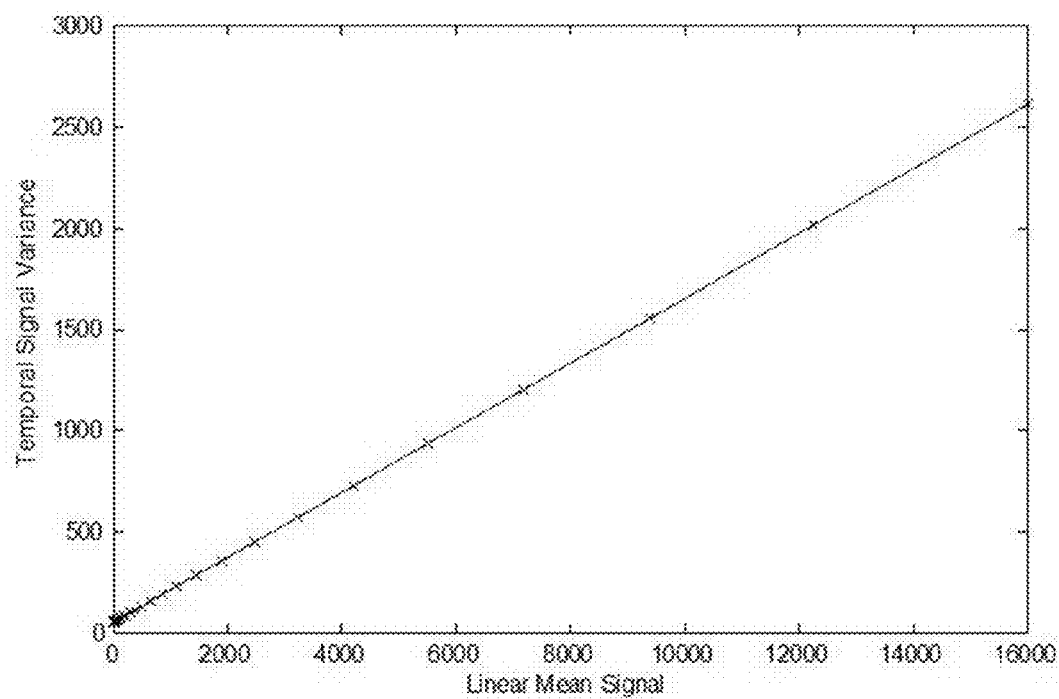
FIG. 2 is a graph showing the temporal variance vs. mean signal level (in the linear code value space) for a series of image captures with an image sensor.

For an image capture system that is operated at a limited number of fixed gains, the behavior of the system can be modeled empirically. To do so, multiple image frames are captured with an image sensor over a wide full signal range, and a table is constructed of image temporal variance vs. mean signal (in the linear code value space), similar to FIG. 2. From this table of measurements, the slope and offset of the relationship shown in Equation (1) can be estimated:

$$\sigma^2 = mL + b \qquad (1)$$

In Equation 1, $\sigma^2$ is the temporal variance, L is the linear mean signal level, m is the slope to be estimated, and b is the offset to be estimated.

Figure 3:
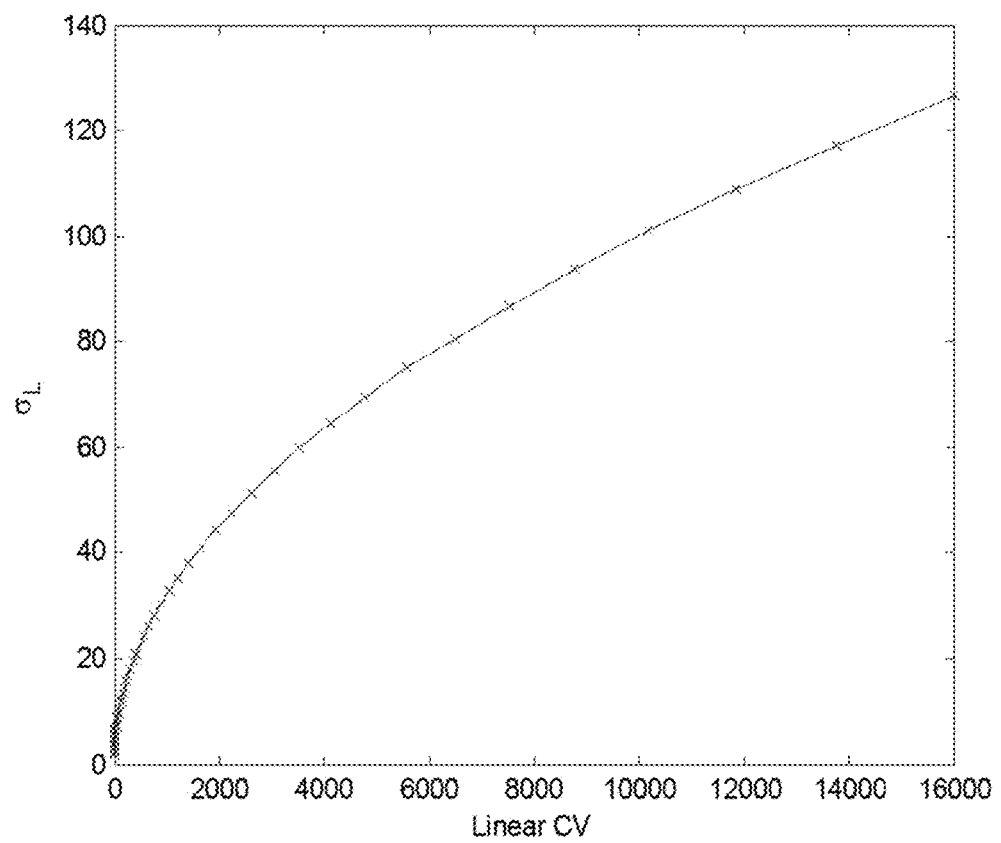
FIG. 3 is a graph showing the temporal standard deviation vs. mean signal level (in the linear code value space) for a series of image captures with an image sensor.

Similarly, FIG. 3 shows the temporal standard deviation (which is the square root of the temporal variance) vs. mean signal level (in the linear code value space) for the multiple image captures with the image sensor. The sigma plotted is standard deviation for a pixel's response, computed over the multiple captures. Still, the overall shape of the relationship between mean code value and sigma has a square-root shape:

$$\sigma = (mL + b)^{1/2} \qquad (2)$$

where L is the linearly quantized signal level, m is the slope of the variance vs. signal level line, and b is the offset, effectively the term for read noise. Representing the signal in the linear code value (linear CV) space shown is statistically inefficient, because at high signal levels, the width of a quantization bin is much smaller relative to the noise in the signal than at lower signal levels.

To address this inefficiency, the width of a quantization interval is selected to be a fraction of a standard deviation. This can be accomplished by using a transform with a derivative that is inversely proportional to the standard deviation of the signal.

$$f' = 1/(h \cdot (mL + b)^{1/2}) \qquad (3).$$

Figure 4:
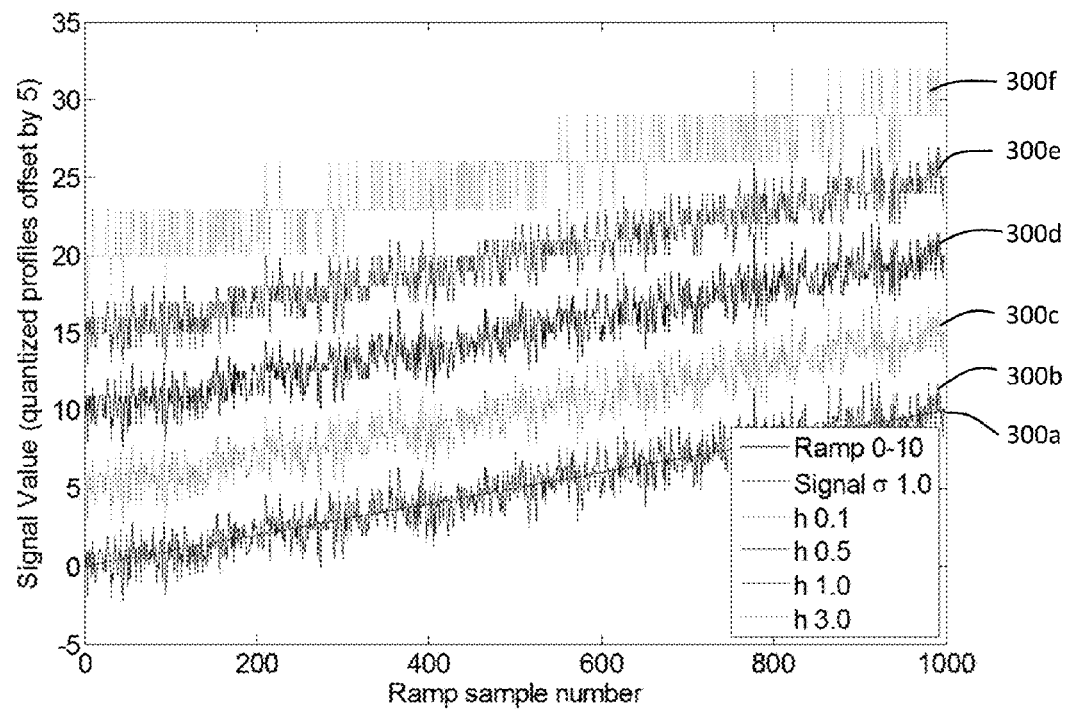
FIG. 4 is a graph showing an original linear ramp, the linear ramp with Gaussian noise added to it, and the noisy signal quantized with various quantization parameters.

In Equation 3, h represents the quantization interval as a fraction of the standard deviation. Quantizing a random signal with an h of one or more generally adds significant quantization noise and artifacts to the signal. To illustrate this, FIG. 4 shows a simple one-dimensional signal (300a) that is a linear ramp from 0-10 over 1000 samples. A Gaussian noise of unit standard deviation is added to the linear signal (300a) to produce a varying signal (300b).

The noisy signal (300b) is then quantized with various h values, ranging from 0.1 to 3.0. As can be seen, quantization with an h of 3.0 introduces obvious quality degradation. Quantizing the signal with an h of 0.1 produces no significant signal degradation, and h values of 0.5 or 1.0 produce signal degradation that is insignificant to marginally significant. To quantify this, the root mean square (RMS) error (RMSE) of each signal (deviation from the original noise-free ramp) is shown below in Table 1.

TABLE 1

| h Value | Normalized RMSE |
|---|---|
| 0.1 | 1.00 |
| 0.5 | 1.01 |
| 1.0 | 1.04 |
| 3.0 | 1.30 |

Table 1 shows the RMSE between the quantized signal and the original perfect ramp, divided by the RMSE of the non-quantized noisy signal, producing a measure of the noise added through the quantization step. The normalized RMSE values show that a relative quantization interval of 0.5 or less produces insignificant loss of information (i.e., 1% error).

In creating an SLT to act as a pre-processing system, there is a practical issue with the slope shown in Equation 3. In particular, depending on the values of b and h, it is possible for the slope to be greater than one, especially near zero, which would expand the code value space. For the purpose of building an SLT, the slope should instead be limited or clipped to at most 1.0, which corresponds to guaranteeing the bin width will never be less than 1. Integrating the resulting clipped slope curve produces a transform that is linear with unit slope in the shadows, until the input signal variance is large enough to justify quantization intervals greater than 1.

The pseudo-code below shows the building of an exemplary lookup table with 65536 entries ($2^{16}$ entries) as would be used with 16-bit image data, although lookup tables of alternate sizes can be built similarly for image data of different bit-sizes (e.g., 8-bit, 12-bit, 24-bit data).

```
For i=0:65535
    linVec[i]=i;
    SLTslope[i]=1.0/(h*sqrt(varSlope*i+varIntercept));
    // guarantees that it won't expand the data
    SLTslope[i]=min (1, SLTslope[i]);
    If i==0
    SLT_float[i]=0;
    Else
    SLT_float [i]=SLT_float [i-1]+SLTslope[i];
    End
    SLT [i]=round (SLT_float [i]);
End
SLTmax=max (SLT);
For i=0:SLTmax
    SLT_inverse_x[i]=i;
    SLT_Inverse_float[i]=linear_interp (i, SLT_float, linVec);
end
SLTInverse=round (SLT_Inverse_float);
```

In the pseudo-code above, h is a floating-point scalar that represents the fraction of a standard deviation for a new code width. For example, a good value for h is 0.2 for a medium compression. Values of h closer to 1 represent more aggressive compression, while smaller values of h yield less compression. The variables varSlope and varIntercept in the source code correspond to the m and b terms, respectively, in equations (1)-(3). The linear_interp function called in the pseudo-code represents a linear interpolation function that provides floating point values based on the two lookup tables sent into the routine. As would be appreciated by those of skill in the art, the linear interpolation function may in alternate embodiments be replaced by other interpolation functions, such as spline interpolation. In yet another embodiment, each inverse table entry is set to the mean of the set of linear code values quantized to that discrete SLT output value.

Figure 5:
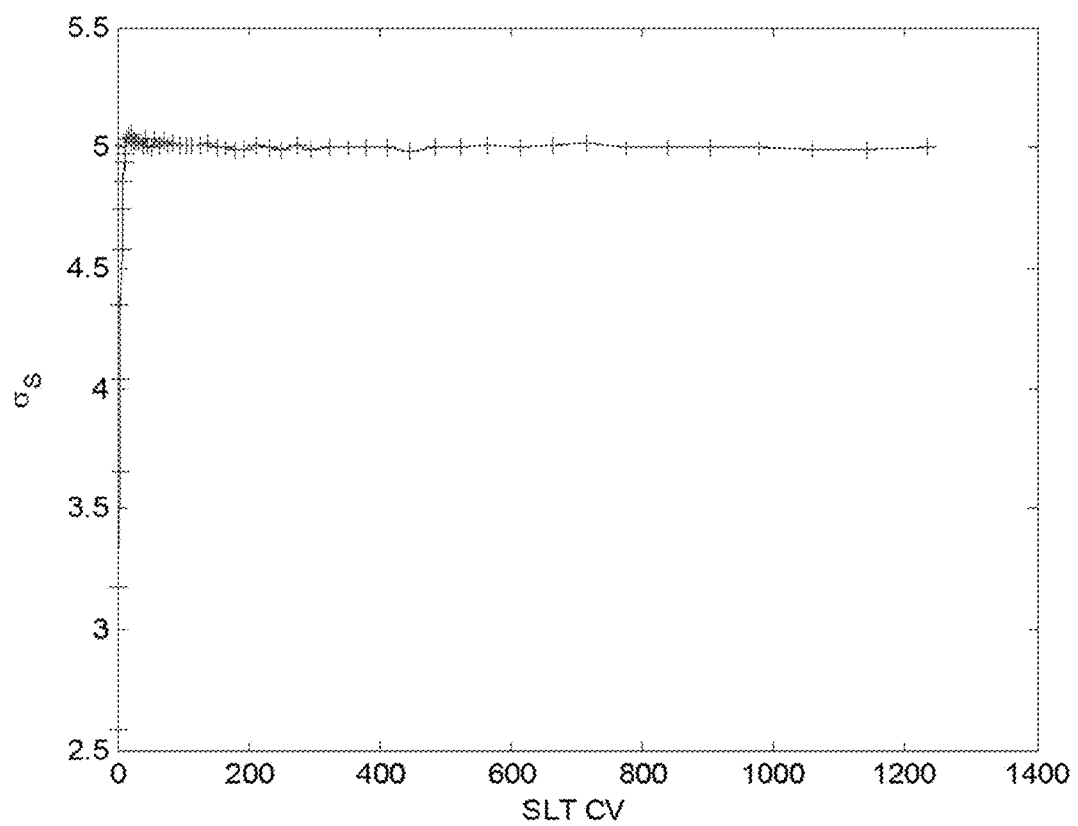
FIG. 5 is a graph showing the standard deviation of a transformed signal using a first quantization value.

FIG. 5 shows a plot of the standard deviation of a transformed signal (having been quantized with h=0.2). Because the bin width was chosen as 0.2, the standard deviation is 5.0 in the transformed space. As mentioned before, the standard deviation drops near the code value zero because the slope is limited to one in the shadows, for example, by using the pseudo-code statement: SLTslope[i] =min (1, SLTslope[1]). Thus, the difference between any two adjacent lookup table entries is at most 1.

Figure 6:
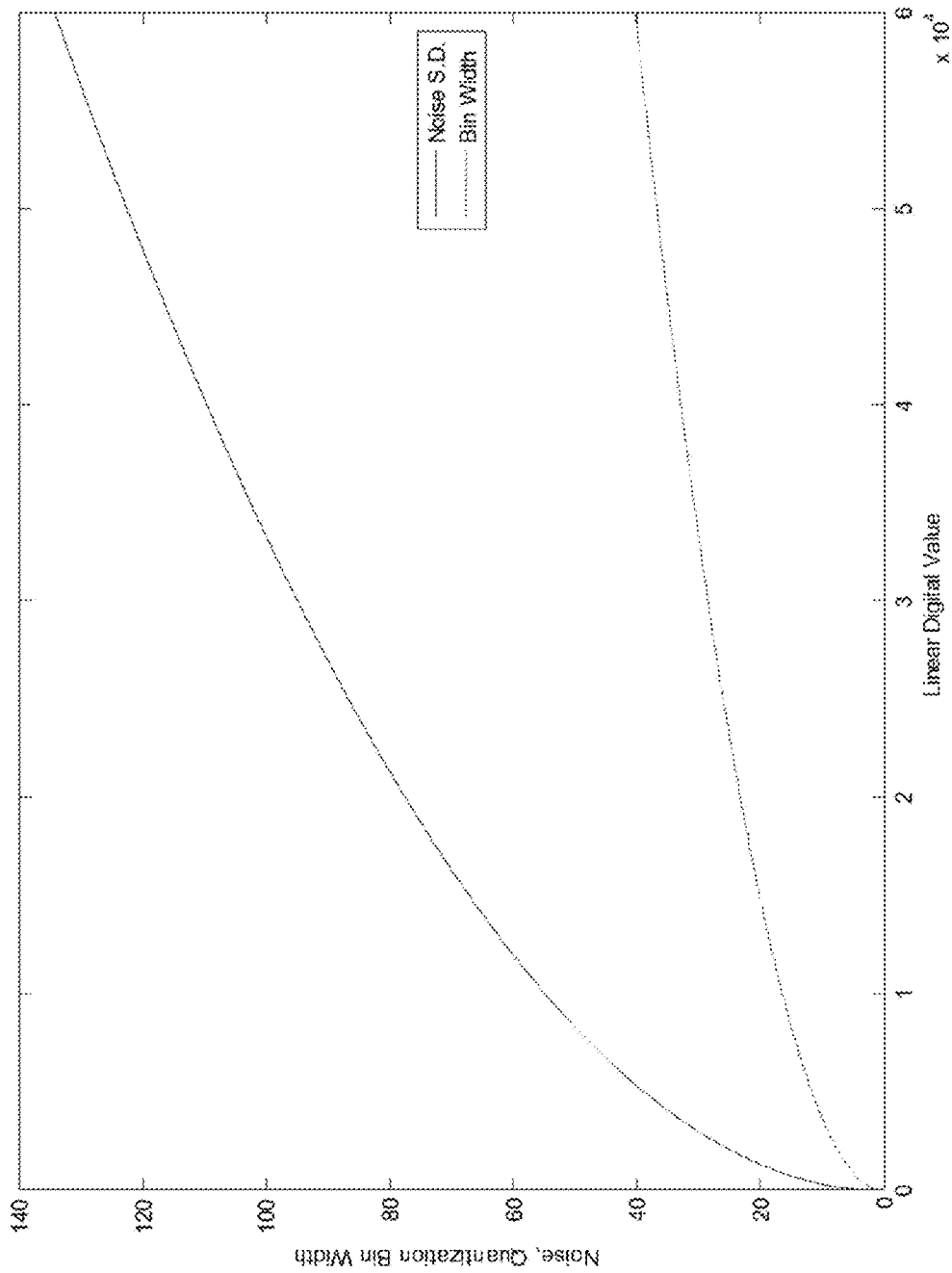
FIG. 6 is a graph showing the relationships between linear digital value (for 16-bit image data) versus bin width and the standard deviation of the noise of the input signal.

FIG. 6 is a graph showing the relationships between linear digital value (for 16-bit image data) versus bin width and the standard deviation of the noise of the input signal. As can be seen, the bin width initially rises quickly then the rate of its growth slows over the range of linear digital values.

Figure 7A:
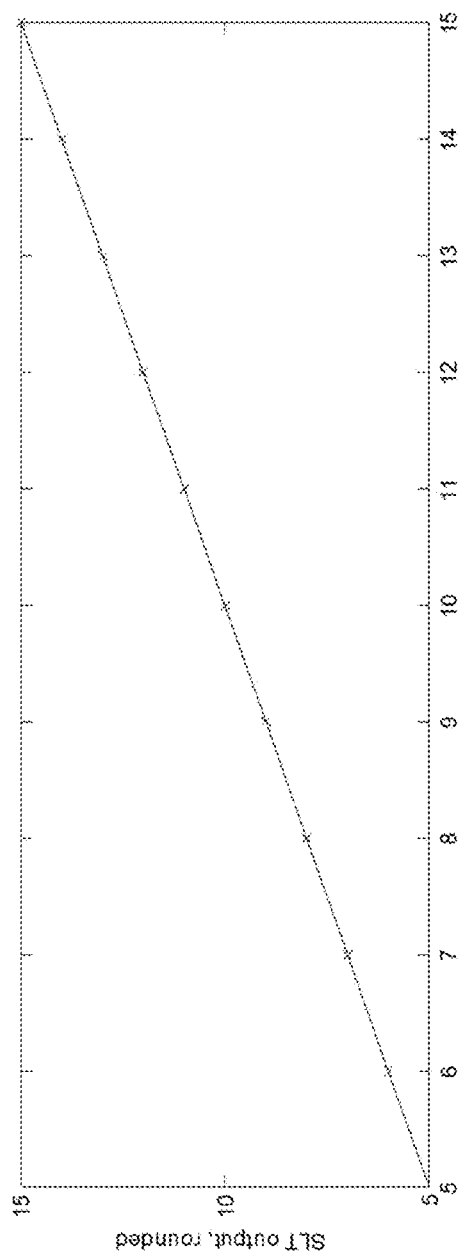
FIG. 7A is a graph showing linear digital value versus the output of the statistically lossless transform (SLT), including rounding or truncation, at the low range of the linear digital values.
Figure 7B:
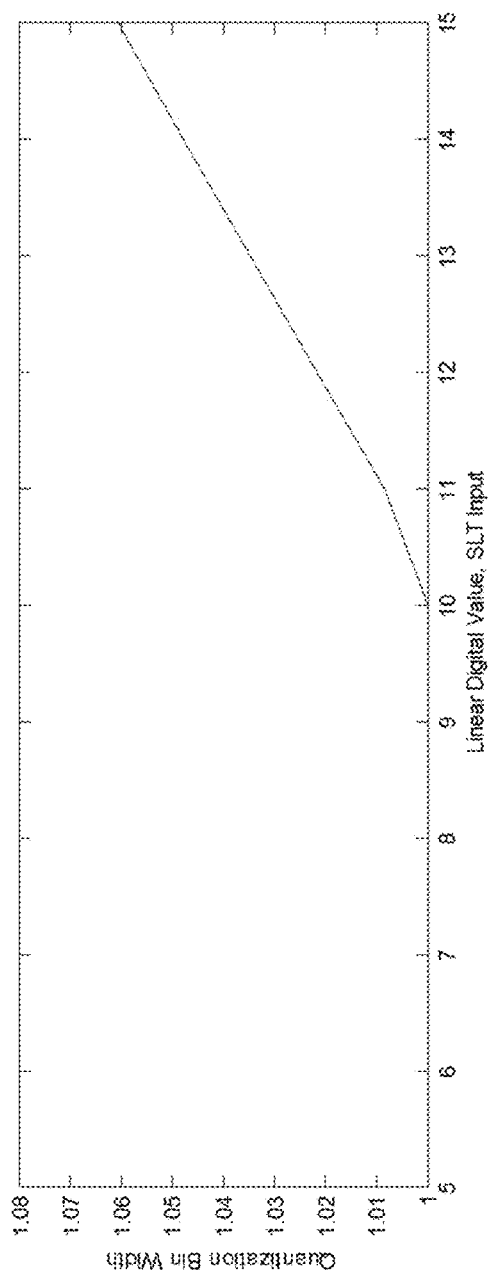
FIG. 7B is an enlarged portion of FIG. 6 and is a graph showing linear digital value versus quantization bin width at the low range of the linear digital values.

To further illustrate how linear digital value correlates with SLT output and quantization bin width, FIGS. 7A and 7B show the low end of the range of values. FIG. 7A is a graph showing linear digital value versus the output of the SLT (including rounding). Similarly, FIG. 7B is an enlarged portion of FIG. 6 and is a graph showing linear digital value versus quantization bin width at the low range of the linear digital values. Until the linear digital value of 10 in the exemplary graph, the bin width remains as "1". After that, bin width rises from 1.01 to 1.06 over the input range of 11 to 15. This corresponds to (rounded) SLT output values that rise by a corresponding amount (essentially one).

Figure 8A:
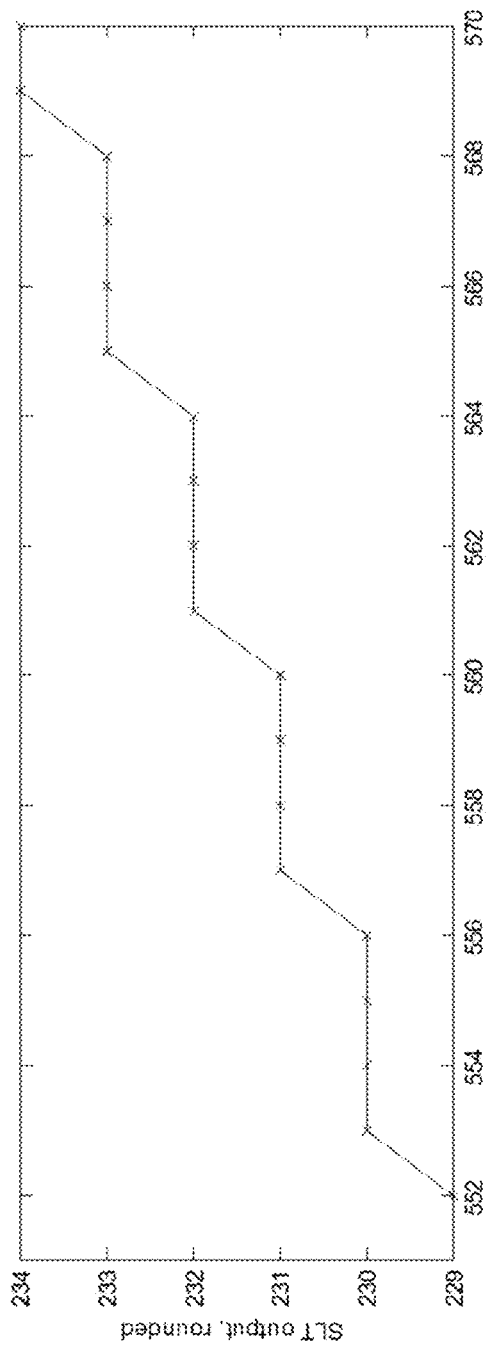
FIG. 8A is a graph showing linear digital value versus the output of the SLT (including rounding) in a higher range of the linear digital values.
Figure 8B:
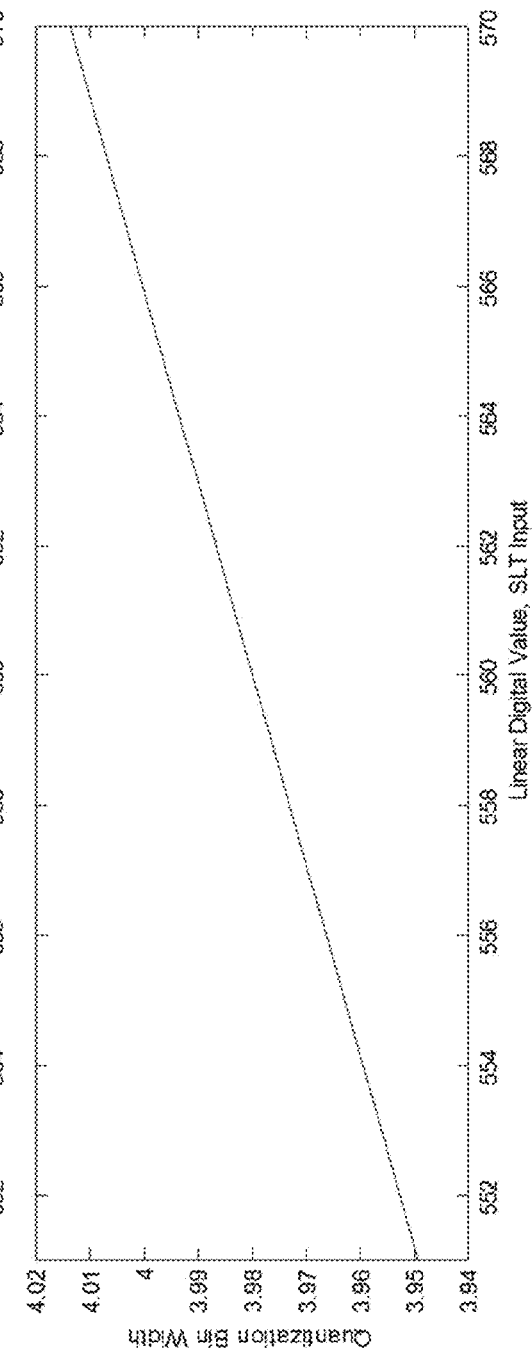
FIG. 8B is an enlarged portion of FIG. 6 and is a graph showing linear digital value versus quantization bin width in a higher range of the linear digital values.

By contrast, FIG. 8A is a graph showing linear digital value versus the output of the SLT (including rounding) in a higher range of the linear digital values. As can be seen in FIG. 8B, which is an enlarged portion of FIG. 6, that range corresponds to bin widths of approximately 4. As a result, plateaus (e.g., 553-556, 557-560, 561-564 and 565-598) of width 4 result in the SLT output, as shown in FIG. 8A. This means that multiple SLT input values (e.g., 553-556) result in the same SLT output (e.g., 230), such that the number of output values of the SLT is decreased as compared to the number of input values (e.g., $2^{16}$). That is, using the pseudo-code example, an input value of 554 would be used as an index into the SLT[ ] array (as SLT[554]) which would output a value of 230 (as would SLT[553], SLT[555] and SLT[556]). In the case of certain image processing applications, the maximum output value from the SLT is typically between 1000 and 6000, depending on the variance parameters, the value of h, and the range of linear values to be re-quantized, and it is typical for the output of the SLT to require 1 to 3 bits less than the original input signal.

Figure 10:
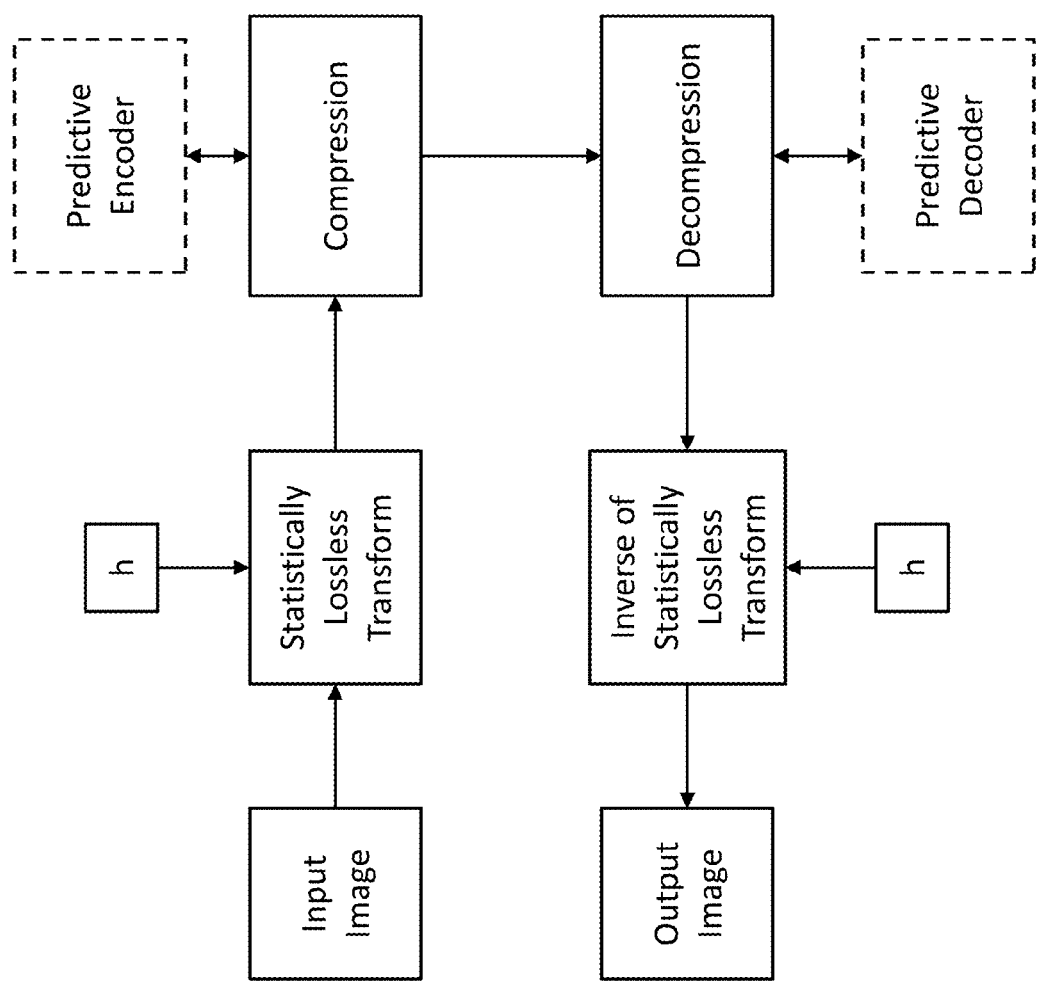
FIG. 10 is a block diagram of an exemplary image processing system utilizing a statistically lossless transform to pre-process image data prior to a compression and a function that is the inverse of the statistically lossless transform to post-process data (i.e., reverse the pre-processing) after decompression/expansion of the compressed data.

The created lookup table is used to preprocess (image) data received from a signal source (e.g., a sensor or a mass storage device storing at least one data file) prior to applying the pre-processed (i.e., transformed) data to a data compressor of a compression system as shown in FIG. 10.

As shown in FIG. 10, the compression and decompression system may further include an optional predictive encoder and predictive decoder pair. In such a configuration, the predictive encoder can pass to the compression system an indication of the predicted value and/or how the predicted value varied from the actual value output by the statistically lossless transform. For example, the compression and decompression systems in FIG. 10 could be based on a numerically lossless image coding process such as described in the Consultative Committee for Space Data Systems recommended standard CCSDS 121.0-B-2. This process encodes the delta (i.e., the mathematical difference) between a signal value and a prediction of that signal. The genesis of this compression approach was published in Rice, R.; Plaunt, J., "Adaptive Variable-Length Coding for Efficient Compression of Spacecraft Television Data," *Communication Technology, IEEE Transactions on*, vol. 19, no. 6, pp. 889,897, December 1971 (hereinafter "Rice"). The compression described in Rice will be referred to herein as "Rice compression."

In alternate embodiments (e.g., a DCT JPEG or a JPEG 2000 image compression), the modulation in the image is encoded using more complicated functions such as DCT coefficients and/or wavelet residuals. In all cases, the essence of lossy image compression is the quantization of image data after a transformation.

The inverse lookup table is similarly used to post process the decompressed data to create a set of post-processed data that is statistically equivalent to the original input data. The lookup tables can be implemented (1) in circuitry as a custom hardware circuit (e.g., part of an ASIC, a one-time configurable logic device, a reconfigurable logic device, a field programmable gate array, or a generic array of logic (GAL)) or (2) as circuitry including (a) a digital computer processor and (b) at least one memory configured to store (b1) the values of the lookup table and (b2) a series of computer instructions for causing the digital computer processor to perform "lookups" in the lookup table, or as a combination of (1) and (2). Similar lookup table building circuitry can be used to build the lookup table. In such a configuration, circuitry (e.g., registers or memory locations) is configured to act as inputs to the table building circuitry for controlling the compression level, the slope and the offset.

There are a number of application-dependent variations possible in development and use of the SLT. A system with high stability could build models into the system and switch between models when needed (e.g., by reloading the lookup table with new values when needed or by changing which lookup table is used depending on some detected image condition). A system with less stability could include the ability to build the model in real time using a calibration mode. When building an SLT from a model, there is still the question of selection of h, which controls the amount of compression desired (and which is balanced by the resulting amount of loss of fidelity). If bandwidth/signal compression is a high priority, an h near 0.5 would be in order, while in other cases an h approaching 0 (such as 0.05 or lower) provides very little compression, with slightly better signal fidelity. In addition, in a configuration in which lookup tables (or their values) can be dynamically changed, the system may further include the ability to dynamically change which value of h is used with the "current" lookup table.

Figure 9A:
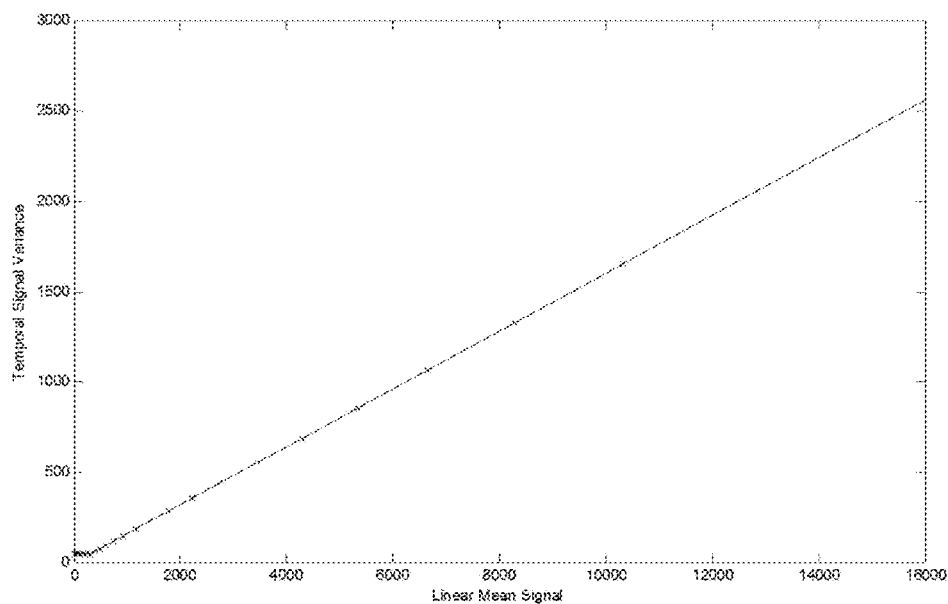
FIG. 9A is a graph showing the temporal variance vs. mean signal level (in the linear code value space) for a series of image captures with an image sensor when there is a positive offset in the mean signal level.
Figure 9B:
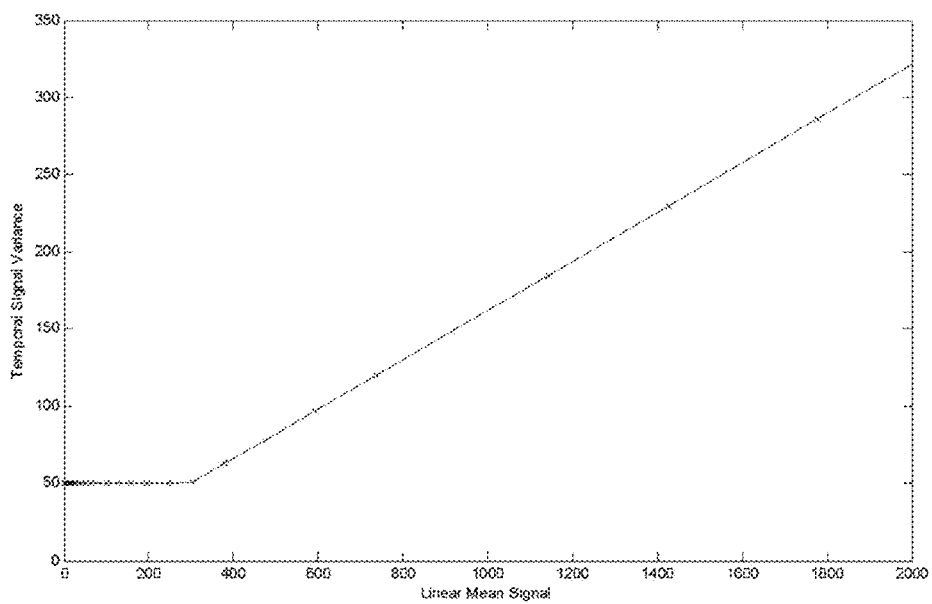
FIG. 9B is an enlarged portion of FIG. 9A showing the temporal variance vs. mean signal level (in the linear code value space) near zero.

Depending on the characteristics of the signal system, it is also possible to have a positive offset in the mean signal level, leading to data that would create a graph more like that in FIG. 9A (and the enlarged portion from FIG. 9B). In such a configuration, the variance becomes constant below the offset signal level. This requires an added parameter in building the lookup table for the SLT and the use of a segmented model, with constant variance below a signal offset, then variance that is linear with signal level above that signal offset. Thus, the resulting SLT will have a quantization bin width that is constant for the first portion of the signal range, then will increase with signal level.

Table 2 below shows the first 45 values in a series of slopes for the SLT, constrained versions of the slope, a running sum of the constrained slopes (labeled SLT_float), and rounded values for the SLT_float to show a correlation between an Index and the outputted codeword (in the Rounded SLT_float column). Table 2 was generated using exemplary values if h=0.2, m=2 and b=10.

TABLE 2

| Index | SLTslope | Constrained SLTslope | SLT_float | Rounded SLT_float |
|---|---|---|---|---|
| 0 | 1.581139 | 1 | 0 | 0 |
| 1 | 1.443376 | 1 | 1 | 1 |
| 2 | 1.336306 | 1 | 2 | 2 |
| 3 | 1.25 | 1 | 3 | 3 |
| 4 | 1.178511 | 1 | 4 | 4 |
| 5 | 1.118034 | 1 | 5 | 5 |
| 6 | 1.066004 | 1 | 6 | 6 |
| 7 | 1.020621 | 1 | 7 | 7 |
| 8 | 0.980581 | 0.980580676 | 7.980581 | 8 |
| 9 | 0.944911 | 0.944911183 | 8.925492 | 9 |
| 10 | 0.912871 | 0.912870929 | 9.838363 | 10 |
| 11 | 0.883883 | 0.883883476 | 10.72225 | 11 |
| 12 | 0.857493 | 0.857492926 | 11.57974 | 12 |
| 13 | 0.833333 | 0.833333333 | 12.41307 | 12 |
| 14 | 0.811107 | 0.811107106 | 13.22418 | 13 |
| 15 | 0.790569 | 0.790569415 | 14.01475 | 14 |
| 16 | 0.771517 | 0.77151675 | 14.78627 | 15 |
| 17 | 0.753778 | 0.753778361 | 15.54004 | 16 |
| 18 | 0.73721 | 0.737209781 | 16.27725 | 16 |
| 19 | 0.721688 | 0.721687836 | 16.99894 | 17 |
| 20 | 0.707107 | 0.707106781 | 17.70605 | 18 |
| 21 | 0.693375 | 0.693375245 | 18.39942 | 18 |
| 22 | 0.680414 | 0.680413817 | 19.07984 | 19 |
| 23 | 0.668153 | 0.668153105 | 19.74799 | 20 |
| 24 | 0.656532 | 0.656532164 | 20.40452 | 20 |
| 25 | 0.645497 | 0.645497224 | 21.05002 | 21 |
| 26 | 0.635001 | 0.635000635 | 21.68502 | 22 |
| 27 | 0.625 | 0.625 | 22.31002 | 22 |
| 28 | 0.615457 | 0.615457455 | 22.92548 | 23 |
| 29 | 0.606339 | 0.606339063 | 23.53182 | 24 |
| 30 | 0.597614 | 0.597614305 | 24.12943 | 24 |
| 31 | 0.589256 | 0.589255651 | 24.71869 | 25 |
| 32 | 0.581238 | 0.581238194 | 25.29993 | 25 |
| 33 | 0.573539 | 0.573539335 | 25.87346 | 26 |
| 34 | 0.566139 | 0.566138517 | 26.4396 | 26 |
| 35 | 0.559017 | 0.559016994 | 26.99862 | 27 |
| 36 | 0.552158 | 0.55215763 | 27.55078 | 28 |
| 37 | 0.545545 | 0.545544726 | 28.09632 | 28 |
| 38 | 0.539164 | 0.539163866 | 28.63549 | 29 |
| 39 | 0.533002 | 0.533001791 | 29.16849 | 29 |
| 40 | 0.527046 | 0.527046277 | 29.69553 | 30 |
| 41 | 0.521286 | 0.521286035 | 30.21682 | 30 |
| 42 | 0.515711 | 0.515710623 | 30.73253 | 31 |
| 43 | 0.51031 | 0.510310363 | 31.24284 | 31 |
| 44 | 0.505076 | 0.505076272 | 31.74792 | 32 |
| 45 | 0.5 | 0.5 | 32.24792 | 32 |

As shown in Table 2, the number of input symbols compared to output symbols is reduced. For example, input symbols 12 and 13 both encode to output symbol 12, and input symbols 17 and 18 both encode to output symbol 16.

The formulation of the SLT has been described above as a discrete approximation to the integral of a slope, such as in equation (3). It is also possible to build a SLT table by iterating through the linear values, computing a bin width each time, using an equation such as:

$$w = \max(1, h(mL+b)^{1/2}) \quad (4)$$

In this form, the set of linear values quantized to a particular SLT value would be the next w linear values, and the system would keep a running total of the total cumulative bin widths. That is, the current output code word at each iteration would be assigned to the next set of input code words that are the difference between the rounded total bin width of the previous output code word and the rounded total bin width of the current output code word. Table 3 shows the output code words, the bin widths, the constrained bin widths, the cumulative bin widths, the number of input code words with the current output code word and what the next input code word is for the next output code word. For example, as seen in Table 3, for bin widths less than one, the system constrains the bin width to be one so that two input code words do not result in the same output code word. Further, the number of input code words that are to be mapped to the same output code word are determined so that the lookup table can be built such that a number of the input code words which are assigned to output one of the output code words is substantially proportional to a standard deviation of the input code words which are assigned to output the same one of the output code words (by taking into consideration the rounding and the constraining described herein). Input code words 0 through 13 in the example are assigned output code words 0 through 13, respectively. However, input code words 13 and 14 are both assigned to the output code word 13, and input code word 15 is assigned to output code word 14. This reduces the number of bits needed to encode the output code words as compared to the input code words (i.e., ceiling($\log_2$ n output code words)<ceiling($\log_2$ m input code words, where ceiling( ) is the ceiling function that rounds a real number to the next higher integer)).

TABLE 3

| output code word | bin_width | constrained bin_width | cumulative bin width | next input codes words with this output code word | code word starts at |
|---|---|---|---|---|---|
| 0 | 0.63245553 | 1 | 1 | 1 | 1 |
| 1 | 0.69282032 | 1 | 2 | 1 | 2 |
| 2 | 0.74833148 | 1 | 3 | 1 | 3 |
| 3 | 0.8 | 1 | 4 | 1 | 4 |
| 4 | 0.84852814 | 1 | 5 | 1 | 5 |
| 5 | 0.89442719 | 1 | 6 | 1 | 6 |
| 6 | 0.93808315 | 1 | 7 | 1 | 7 |
| 7 | 0.9797959 | 1 | 8 | 1 | 8 |
| 8 | 1.0198039 | 1.019803903 | 9.019803903 | 1 | 9 |
| 9 | 1.05830052 | 1.058300524 | 10.07810443 | 1 | 10 |
| 10 | 1.09544512 | 1.095445115 | 11.17354954 | 1 | 11 |
| 11 | 1.13137085 | 1.13137085 | 12.30492039 | 1 | 12 |
| 12 | 1.16619038 | 1.166190379 | 13.47111077 | 1 | 13 |
| 13 | 1.2 | 1.2 | 14.67111077 | 2 | 15 |
| 14 | 1.2328828 | 1.232882801 | 15.90399357 | 1 | 16 |
| 15 | 1.26491106 | 1.264911064 | 17.16890464 | 1 | 17 |
| 16 | 1.29614814 | 1.29614814 | 18.46505278 | 1 | 18 |
| 17 | 1.32664992 | 1.326649916 | 19.79170269 | 2 | 20 |
| 18 | 1.356466 | 1.356465997 | 21.14816869 | 1 | 21 |
| 19 | 1.38564065 | 1.385640646 | 22.53380933 | 2 | 23 |
| 20 | 1.41421356 | 1.414213562 | 23.9480229 | 1 | 24 |
| 21 | 1.44222051 | 1.44222051 | 25.39024341 | 1 | 25 |
| 22 | 1.46969385 | 1.469693846 | 26.85993725 | 2 | 27 |
| 23 | 1.49666295 | 1.496662955 | 28.35660021 | 1 | 28 |
| 24 | 1.52315462 | 1.523154621 | 29.87975483 | 2 | 30 |
| 25 | 1.54919334 | 1.549193338 | 31.42894817 | 1 | 31 |

Although the above examples show the output code words being assigned sequentially, the order that the output code words are assigned may be varied (e.g., inverse sequentially starting from a fixed upper value, substantially sequentially, or even randomly within the range of output values to be used) as long as the assignment of the output code words results in a lower number of bits being assigned to the output code words as opposed to the input code words. Moreover, all possible output code words needs not be used when generating a lookup table as long as the assignment of the range of the output code words from the m input code words results in a lower number of bits being assigned to the output code words as opposed to the m input code words, such that ceiling($\log_2$ m)>ceiling($\log_2$ n), where the value of "n" is the value of the maximum output code word. For example, as compared to the minimum range of output code words which uniquely map the input code words to the output code words, a small increase (up to 5% or 10% of the minimum)

could be used as long as the small increase does not result in additional bits being required to encode the output code words. Such configurations will be referred to as herein as a substantially minimum range and as a nearly substantially minimum range, respectively.

In some embodiments, where additional coding is done to compress the output of the SLT further, there is advantage to changing the range of the output of the SLT, even if the change does not reduce the number of bits needed to represent the output symbols. For example, for a given image compressed with Rice compression, if the output of the SLT has a range of [0,1800], that will still compress more efficiently than if the output of the SLT has a range of [0,2047]. In such embodiments, the substantially minimum range has a range of no more than 5% greater than the minimum range and the nearly substantially minimum range has a range of no more than 10% greater than the minimum range, both while still reducing the compression efficiency of a later compression stage.

In addition to the two embodiments described, other functional forms may be used to approximate the behavior of the SLT. In particular, the shape of the SLT can be approximated with a power law function and with a ratio of polynomials. The ratio of polynomials has the advantage of not requiring evaluation of a function such as a logarithm or a square root.

While certain configurations of structures have been illustrated for the purposes of presenting the basic structures of the present invention, one of ordinary skill in the art will appreciate that other variations are possible which would still fall within the scope of the appended claims.

The invention claimed is:

1. In an encoding system including a data source, pre-processing circuitry, and a compressor, the improvement comprising:
pre-processing circuitry configured to receive digital data from the data source, perform a statistically lossless transform on the received data, and output transformed data to the compressor, wherein the statistically lossless transform receives a series of m input code words and outputs a series of n output code words wherein m>n and wherein, for each of the input code words, a number of the adjacent input code words which are pre-processed to output a same one of the output code words is substantially proportional to a standard deviation of the adjacent input code words which are pre-processed to output the same one of the output code words, and wherein each input code word of the input code words is assigned at most one of the output code words.

2. In the encoding system of claim 1, wherein the circuitry configured to perform the statistically lossless transform comprises at least one of an ASIC, a one-time configurable logic device, re-configurable logic device, a field programmable gate array, and a generic array of logic.

3. In the encoding system of claim 1, wherein the circuitry configured to perform the statistically lossless transform comprises circuitry including (a) a digital computer processor and (b) at least one non-transitory computer-readable memory configured to store (b1) the values of a lookup table and (b2) a series of computer instructions for causing the digital computer processor to perform lookups in the lookup table.

4. In the encoding system of claim 1, wherein the circuitry configured to perform the statistically lossless transform comprises a lookup table.

5. In the encoding system of claim 4, wherein the encoding system further comprises table building circuitry and circuitry configured to act as inputs to the table building circuitry for controlling a compression level, a slope and an offset used to build the lookup table.

6. In the encoding system of claim 1, wherein the output code words are substantially monotonically increasing with increasing values for the input code words.

7. In the encoding system of claim 1, wherein the output code words are selected from a minimum range of output codes words.

8. In the encoding system of claim 7, wherein the output code words are substantially monotonically increasing with increasing values for the input code words.

9. In the encoding system of claim 1, wherein the output code words are selected from a substantially minimum range of output codes words.

10. In the encoding system of claim 9, wherein the output code words are substantially monotonically increasing with increasing values for the input code words.

11. A method of building lookup table for performing a statistically lossless transform, the method comprising the steps of:
assigning output code words to which input code words of a sampled signal are to be transformed by calculating bin widths for the output code words, wherein the bin width of each of the output code words is substantially proportional to the standard deviation of a sampling of the input code words that are to be assigned the each of the output code words;
constraining bin widths of the output code words to be at least a bin width of one; and
storing in the lookup table the output code words indexed by the input code words.

12. The method as claimed in claim 11, wherein the standard deviation is calculated according to $h \cdot (mL+b)^{1/2}$, where L is a linearly quantized signal level of the sampled signal, m is a slope of the variance vs. signal level line, b is an offset to correct for read noise, and h represents a quantization interval as a fraction of the standard deviation.

13. The method as claimed in claim 11, wherein the output code words are substantially monotonically increasing with increasing values for the input code words.

14. The method as claimed in claim 11, wherein the output code words are selected from a minimum range of output codes words.

15. The method as claimed in claim 14, wherein the output code words are substantially monotonically increasing with increasing values for the input code words.

16. The method as claimed in claim 11, wherein the output code words are selected from a substantially minimum range of output codes words.

17. The method as claimed in claim 16, wherein the output code words are substantially monotonically increasing with increasing values for the input code words.

18. In the encoding system of claim 1, wherein the standard deviation is calculated according to $h \cdot (mL+b)^{1/2}$, where L is a linearly quantized signal level of the sampled signal, m is a slope of the variance vs. signal level line, b is an offset to correct for read noise, and h represents a quantization interval as a fraction of the standard deviation.

19. In the encoding system of claim 2, wherein the standard deviation is calculated according to $h \cdot (mL+b)^{1/2}$, where L is a linearly quantized signal level of the sampled signal, m is a slope of the variance vs. signal level line, b is an offset to correct for read noise, and h represents a quantization interval as a fraction of the standard deviation.

20. In the encoding system of claim 3, wherein the standard deviation is calculated according to $h \cdot (mL+b)^{1/2}$, where L is a linearly quantized signal level of the sampled signal, m is a slope of the variance vs. signal level line, b is an offset to correct for read noise, and h represents a quantization interval as a fraction of the standard deviation.

* * * * *